United States Patent
Line et al.

(10) Patent No.: US 11,634,098 B1
(45) Date of Patent: Apr. 25, 2023

(54) AIRBAG SUPPORTED BY AN ARMREST OF A VEHICLE SEAT

(71) Applicant: Ford Global Technologies, LLC, Dearborn, MI (US)

(72) Inventors: Johnathan Andrew Line, Northville, MI (US); S. M. Akbar Berry, Windsor (CA); Marcos Silva Kondrad, Macomb Township, MI (US); Robyne Mcbride, Belle River (CA); Benjamin Yilma, Canton, MI (US); Raed Essa El-Jawahri, Northville, MI (US); Jeffrey C. Paddock, Dearborn Heights, MI (US); Chuck R. Reese, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/932,390

(22) Filed: Sep. 15, 2022

(51) Int. Cl.
  *B60R 21/207* (2006.01)
  *B60R 21/0136* (2006.01)
  *B60R 21/231* (2011.01)
  *B60N 2/75* (2018.01)

(52) U.S. Cl.
  CPC ............. *B60R 21/207* (2013.01); *B60N 2/77* (2018.02); *B60R 21/0136* (2013.01); *B60R 21/23138* (2013.01); *B60R 2021/23146* (2013.01)

(58) Field of Classification Search
  None
  See application file for complete search history.

(56) References Cited

U.S. PATENT DOCUMENTS

| 5,333,899 | A | * | 8/1994 | Witte | B60R 21/23138 |
| | | | | | 280/730.2 |
| 5,730,458 | A | * | 3/1998 | Byon | B60N 2/79 |
| | | | | | 280/730.2 |
| 9,434,340 | B2 | | 9/2016 | Egusa | |
| 10,723,249 | B2 | * | 7/2020 | Dry | B60N 2/753 |
| 11,254,248 | B1 | * | 2/2022 | Line | B60N 2/767 |

FOREIGN PATENT DOCUMENTS

| CN | 112060997 A | | 12/2020 | |
| DE | 202006019786 U1 | * | 4/2007 | ........... B60R 21/207 |
| DE | 102019005523 A1 | | 3/2020 | |
| DE | 102018220078 A1 | | 5/2020 | |
| DE | 102020101621 A1 | * | 7/2021 | |
| FR | 3102961 A1 | * | 5/2021 | ............ B60N 2/753 |
| JP | 2007112215 A | | 5/2007 | |
| JP | 2016074244 A | * | 5/2016 | |
| JP | 2018171995 A | * | 11/2018 | ............... B60N 2/75 |

\* cited by examiner

*Primary Examiner* — Faye M Fleming
(74) *Attorney, Agent, or Firm* — Frank A. MacKenzie; Bejin Bieneman PLC

(57) ABSTRACT

An assembly includes a vehicle seat. The assembly includes an armrest supported by the vehicle seat. The armrest includes an upright portion elongated along an axis and an arm support portion supported by the upright portion. The assembly includes an airbag supported by the arm support portion of the armrest. The airbag inflatable to an inflated position. The airbag includes an upper portion extending upwardly from the arm support portion when the airbag is in the inflated position and a lower portion extending downwardly from the arm support portion when the airbag is in the inflated position. The upper portion is vehicle-inboard of the axis and the lower portion being vehicle-outboard of the axis.

19 Claims, 8 Drawing Sheets

AIRBAG SUPPORTED BY AN ARMREST OF A VEHICLE SEAT

BACKGROUND

An airbag is mounted to a seat assembly and is inflatable along a side of an occupant, specifically along the torso and/or hip of the occupant. The airbag, for example, may be inflatable between the occupant and a vehicle door or other components of the vehicle. The airbag may control the kinematics of the occupant in vehicle impacts that urge the occupant in a cross-vehicle direction, e.g., a side impact.

DETAILED DESCRIPTION

Figure 1:
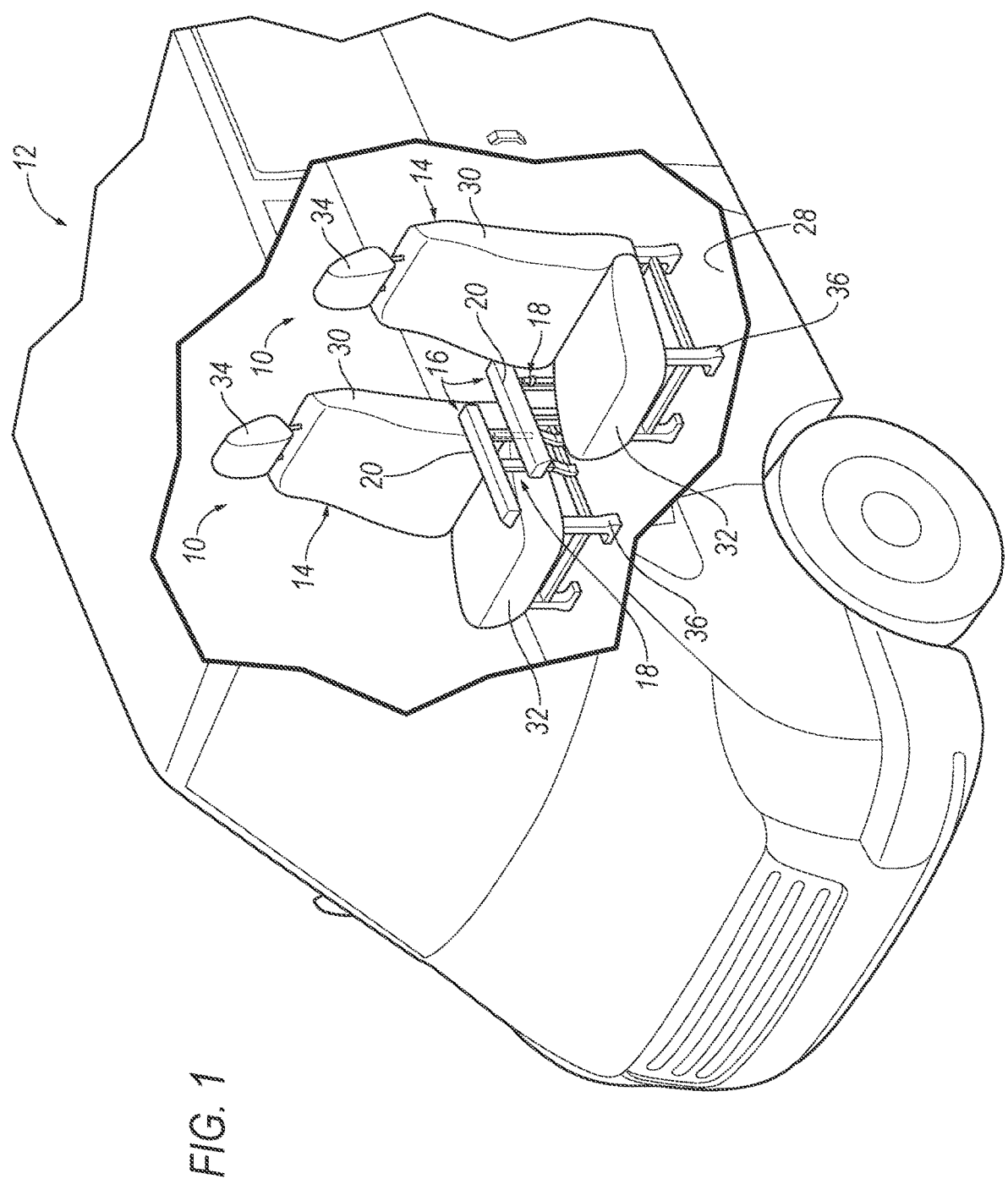
FIG. 1 is a perspective view of a vehicle having a seat with an armrest supported by a seat bottom of the seat.
Figure 2:
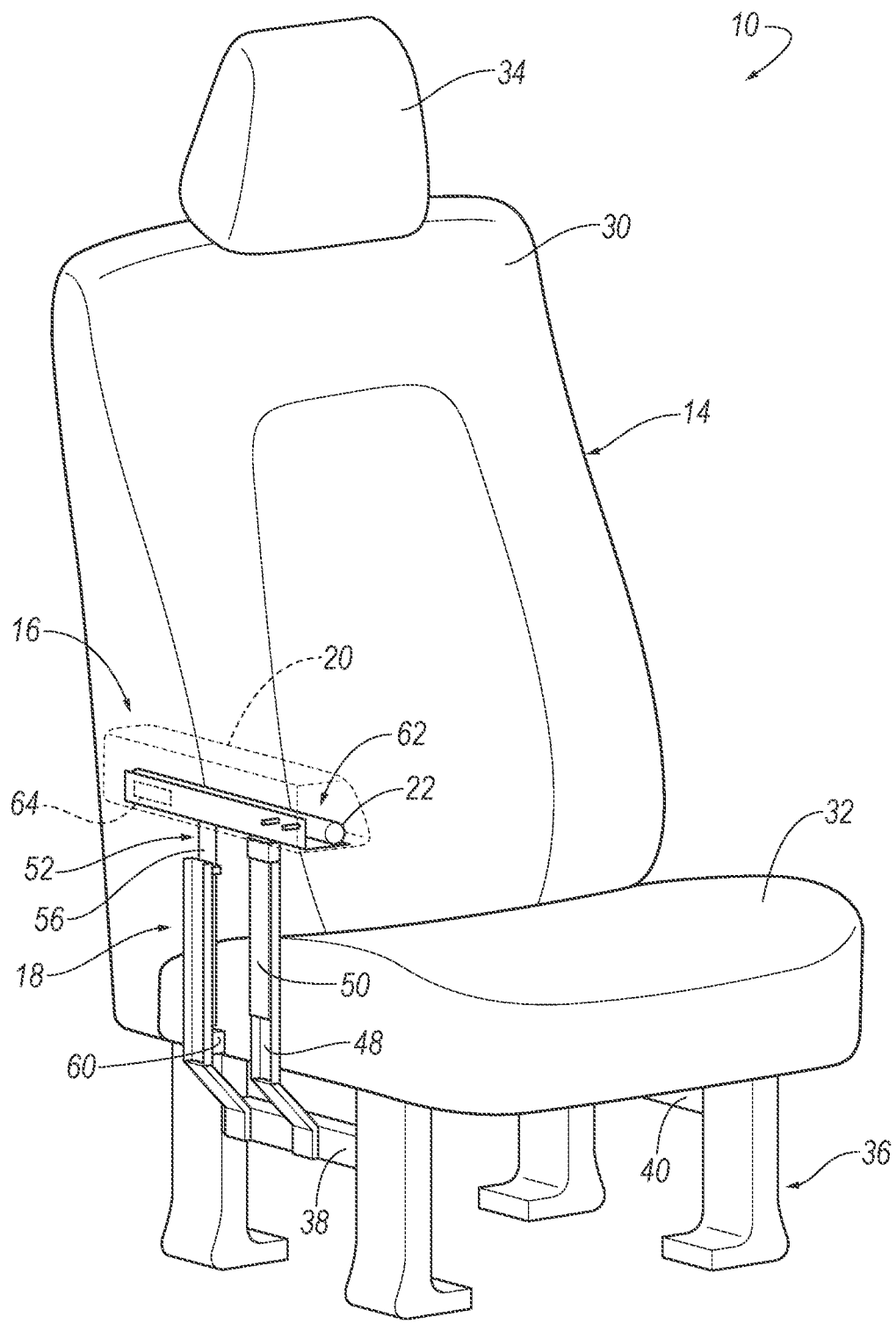
FIG. 2 is a perspective view of the seat with the armrest in a lowered position.

An assembly includes a vehicle seat. The assembly includes an armrest supported by the vehicle seat. The armrest includes an upright portion elongated along an axis and an arm support portion supported by the upright portion. The assembly includes an airbag supported by the arm support portion of the armrest. The airbag inflatable to an inflated position. The airbag includes an upper portion extending upwardly from the arm support portion when the airbag is in the inflated position and a lower portion extending downwardly from the arm support portion when the airbag is in the inflated position. The upper portion is vehicle-inboard of the axis and the lower portion being vehicle-outboard of the axis.

The lower portion of the airbag may abut the upright portion of the armrest when the airbag is in the inflated position.

The upper portion of the airbag may include an inboard panel and the lower portion of the airbag includes an outboard panel, the inboard panel being spaced cross-vehicle from the outboard panel.

The inboard panel may be offset vehicle-inboard from the axis when the airbag is in the inflated position and the outboard panel is offset vehicle-outboard from the axis when the airbag is in the inflated position.

The vehicle seat may define an occupant seating area, the lower portion of the airbag being between the occupant seating area and the upright portion of the armrest.

The outboard panel may be spaced from the axis by a first distance and the outboard panel is spaced from the inboard panel by a second distance, the second distance being larger than the first distance.

The upper portion may be vehicle-inboard of the vehicle seat.

The vehicle seat may define an occupant head area and an occupant hip area below the occupant head area, the upper portion being adjacent the occupant head area and the lower portion being adjacent the occupant hip area.

The airbag may define an inflation chamber that extends from the upper portion to the lower portion of the airbag.

The upper portion may be elongated upwardly along the axis and the lower portion is elongated downwardly along the axis.

The airbag may be supported by and inflatable from a seat-inboard side of the arm support portion.

The armrest may be extendable upwardly along the axis from a lowered position to a raised position.

The airbag may be inflatable from an uninflated position to the inflated position, the airbag being in the inflated position when the armrest is in the raised position and the airbag being in the uninflated position when the armrest is in the lowered position.

The arm support portion may be movable upwardly along the axis.

The upright portion may include a track elongated along the axis, the arm support portion being movable along the track from a lowered position to a raised position.

The upright portion may include a piston elongated along the axis, the arm support portion being movable along the axis by the piston.

The assembly may include a pyrotechnic device operatively coupled to the piston.

The assembly may include a computer including a processor and a memory storing instructions executable by the processor to initiate movement of the armrest along the axis from a lowered position to a raised position and inflate the airbag to the inflated position after initiation of movement of the armrest.

The instructions to move the armrest along the axis from the lowered position to the raised position may include instructions to activate a pyrotechnic device to move the armrest along the axis.

With reference to the Figures, wherein like numerals indicate like parts throughout the several views, an assembly 10 for a vehicle 12 includes a vehicle seat 14. The assembly 10 includes an armrest 16 supported by the vehicle seat 14. The armrest 16 includes an upright portion 18 elongated along an axis A and an arm support portion 20 supported by the upright portion 18. The assembly 10 includes an airbag 22 supported by the arm support portion 20 of the armrest 16. The airbag 22 inflatable to an inflated position. The airbag 22 includes an upper portion 24 extending upwardly from the arm support portion 20 when the airbag 22 is in the inflated position and a lower portion 26 extending downwardly from the arm support portion 20 when the airbag 22 is in the inflated position. The upper portion 24 is vehicle-inboard of the axis A and the lower portion 26 being vehicle-outboard of the axis A.

In the event of an impact to the vehicle 12, for example, certain far-side impact, the airbag 22 inflates to the inflated position. The airbag 22 controls the kinematics of an occupant seated in the vehicle seat 14 in the event of the impact. The lower portion 26 may control the kinematics of a portion, e.g., the hip, of the occupant, while the upper portion 24 may control the kinematics of another portion, e.g., the head, of the occupant. The lower portion 26 is vehicle-outboard of the axis A and the upper portion 24 is vehicle-inboard of the axis A, i.e., the lower portion 26 and the upper portion 24 are offset from each other along the axis A. The upper portion 24 may limit contact between the occupant of the seat 14 and other occupants of the vehicle 12. The lower portion 26 may control the kinematics of the occupant of the seat 14 adjacent the upright portion 18 of the armrest 16.

With reference to FIG. 1, the vehicle 12 may be any suitable type of automobile, e.g., a passenger or commercial automobile such as a sedan, a coupe, a truck, a sport utility vehicle, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered). The body may be of a unibody construction. In the unibody construction, the body, e.g., rockers, serves as a frame, and the body (including the rockers, pillars, roof rails, etc.) is unitary, i.e., a continuous one-piece unit. As another example, the body and frame may have a body-on-frame construction (also referred to as a cab-on-frame construction). In other words, the body and frame are separate components, i.e., are modular, and the body is supported on and affixed to the frame. Alternatively, the body may have any suitable construction. The body may be formed of any suitable material, for example, steel, aluminum, etc.

The body defines a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle 12, specifically the body of the vehicle 12 includes a vehicle floor 28 and a vehicle 12 roof (not numbered) spaced from the vehicle floor 28. The passenger compartment and may extend from the front end of the passenger compartment to the rear end of the passenger compartment. The vehicle floor 28 may include upholstery, for example, carpet, and may have a class-A surface facing the passenger compartment, i.e., a surface specifically manufactured to have a high quality, finished, aesthetic appearance free of blemishes.

With continued reference to FIG. 1, the vehicle 12 may include one or more seats 14. Specifically, the vehicle 12 may include any suitable number of seats 14. As shown in FIG. 1, the seats 14 are supported by the vehicle floor 28. The seats 14 may be arranged in any suitable arrangement in the passenger compartment. As in the example shown in the Figures, one or more of the seat 14 may be at the front end of the passenger compartment, e.g., a driver seat 14 and/or a passenger seat 14. In other examples, one or more of the seats 14 may be behind the front end of the passenger compartment, e.g., at the rear end of the passenger compartment. The seats 14 may be movable relative to the vehicle floor 28 to various positions, e.g., movable fore-and-aft and/or cross-vehicle. The seats 14 may be of any suitable type, e.g., a bucket seat shown in FIG. 1.

With reference to FIGS. 2-7, the seats 14 include a seatback 30, a seat bottom 32, and a head restraint 34. The head restraint 34 may be supported by and extending upwardly from the seatback 30. The head restraint 34 may be stationary or movable relative to the seatback 30. The seatback 30 may be supported by the seat bottom 32 and may be stationary or movable relative to the seat bottom 32. The seatback 30 and the seat bottom 32 may be adjustable in multiple degrees of freedom. Specifically, the seatback 30 and the seat bottom 32 may themselves be adjustable. In other words, the seatback 30 and/or seat bottom 32 may include adjustable components within the seatback 30 and/or the seat bottom 32, and/or may be adjustable relative to each other.

The seat 14 includes a seat frame 36 is supported by the vehicle floor 28. Specifically, the seat frame 36 may include frame members that are engageable with the vehicle floor 28. A plurality of fasteners may engage the seat frame 36 with the vehicle floor 28.

As an example, the seat frame 36 may include a seatback 30 frame (not shown) and a seat bottom 32 frame (not numbered). Specifically, the seatback 30 may include the seatback 30 frame and the seat bottom 32 may include the seat bottom 32 frame. The seat frame 36, e.g., the seat bottom 32 frame and the seatback 30 frame, may include tubes, beams, etc. The seat frame 36 may be of any suitable plastic material, e.g., carbon fiber reinforced plastic (CFRP), glass fiber-reinforced semi-finished thermoplastic composite (organosheet), etc. The seat frame 36 may be metal. As another example, some or all components of the seatback 30 frame may be formed of a suitable metal, e.g., steel, aluminum, etc.

The seat frame 36 includes a vehicle-inboard end 38 and a vehicle-outboard end 40. The vehicle-inboard end 38 may be vehicle-inboard of the vehicle-outboard end 40. The vehicle-inboard end 38 may be adjacent a center of the passenger compartment. The vehicle-outboard end 40 may be adjacent a door of the vehicle 12.

The seatback 30 and the seat bottom 32 define an occupant seating area 42 of the seat 14. The occupant seating area 42 is the area occupied by an occupant when properly seated on the seat bottom 32 and the seat 14 back. The occupant seating area 42 is in a seat-forward direction of the seatback 30 and above the seat bottom 32.

The seat 14 defines an occupant head area 44. The occupant head area 44 is vehicle-forward of the seatback 30 of the seat 14. The occupant head area 44 is the volume V typically occupied by the head of an occupant properly seated in the seat 14 of the vehicle 12.

The seat 14 defines an occupant hip area 46 below the occupant head area 44.

Specifically, the occupant hip area 46 is spaced downwardly from the occupant head area 44. The occupant hip area 46 is vehicle-forward of the seatback 30 of the seat 14. The occupant hip area 46 is the volume V typically occupied by the hip of an occupant properly seated in the seat 14 of the vehicle 12.

With continued reference to FIGS. 2-7, the assembly 10 includes the armrest 16 supported by the seat 14. The armrest 16 may be supported by the seat frame 36 of the seat 14. Specifically, such as in the example shown in the Figures, the armrest 16 may be supported by the seat bottom 32 frame. In other examples, the armrest 16 may be supported by the seatback 30 frame of the seat frame 36. The weight an occupant places on the armrest 16 when seated in the seat 14 is supported by the seat frame 36.

In the example shown in the Figures, the armrest 16 is supported on the vehicle-inboard end 38 of the seat frame 36 when the seat 14 assembly 10 is in the forward-facing position. In other words, when an occupant is seated in the seat 14 assembly 10 the armrest 16 is to the right of the occupant. The armrest 16 is supported on the vehicle-inboard end 38 of the seat frame 36 for the event of certain far-side impacts to the vehicle 12. In other words, the impact to the vehicle 12 may be vehicle-outboard of the armrest 16 and move in a cross-vehicle direction from the vehicle-outboard end 40 of the seat frame 36 toward the vehicle-inboard end 38 of the seat frame 36, i.e., the opposite side of the seat 14 from the armrest 16.

The armrest 16 includes the arm support portion 20 and the upright portion 18. The arm support portion 20 is supported by the upright portion 18 at an upper end of the upright portion 18. Specifically, the arm support portion 20 may be mounted to the upright portion 18, e.g., by fasteners, welding, etc. The arm support portion 20 is designed to support an arm of an occupant that may be seated in the seat 14. The upright portion 18 is connected to the seat frame 36. Specifically, the upright portion 18 may be supported by the seat frame 36. The upright portion 18 may be supported by the seat frame 36 in any suitable way at any suitable location. The upright portion 18 may be mounted to the seat frame 36, e.g., by fasteners, welding, etc. In some examples, such as shown in the Figures, the upright portion 18 may be supported by the seat bottom 32 frame. In other examples, the upright portion 18 may be supported by the seatback 30 frame.

Figure 4:
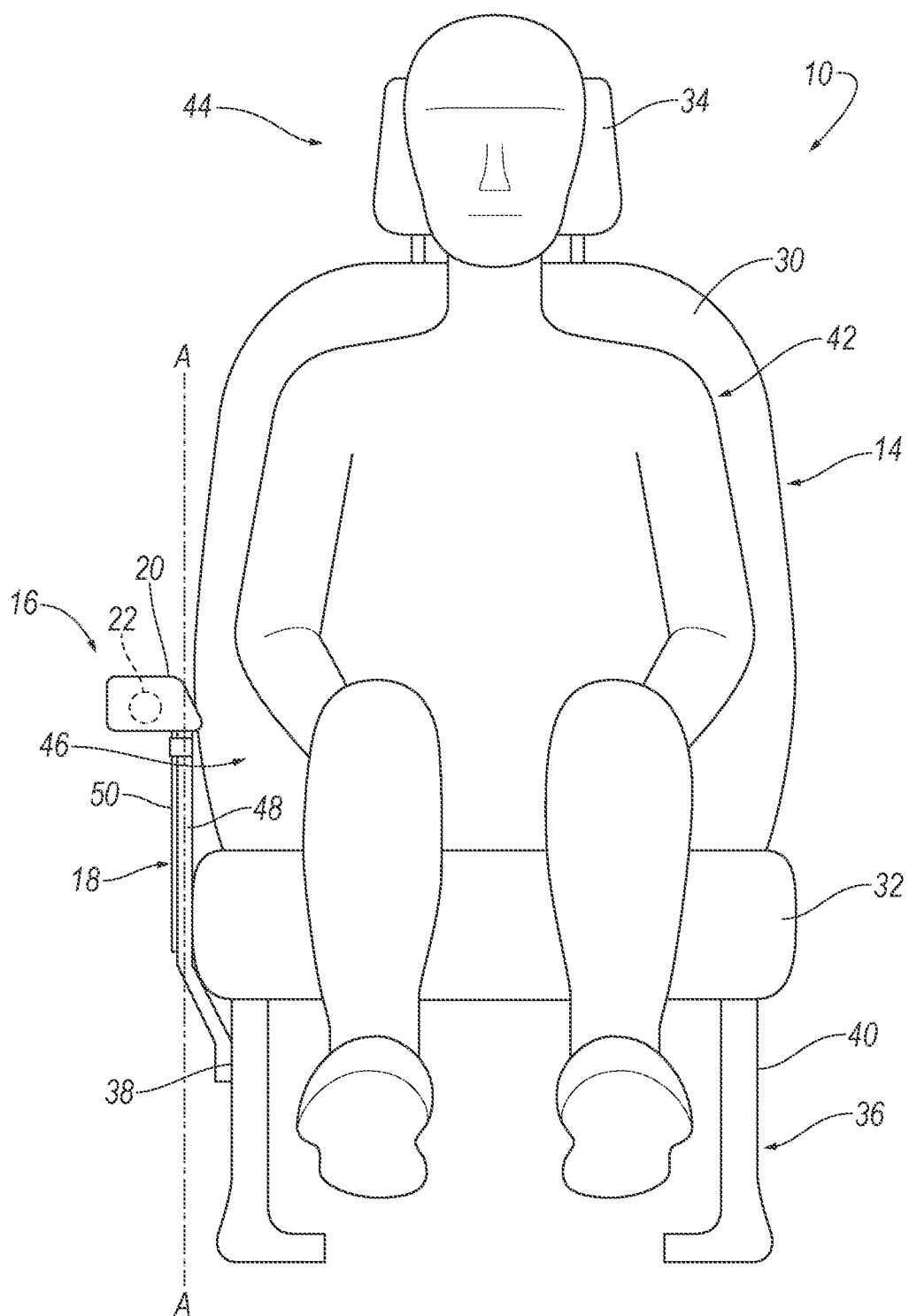
FIG. 4 is a frontal view of the seat with the armrest in the lowered position.
Figure 5:
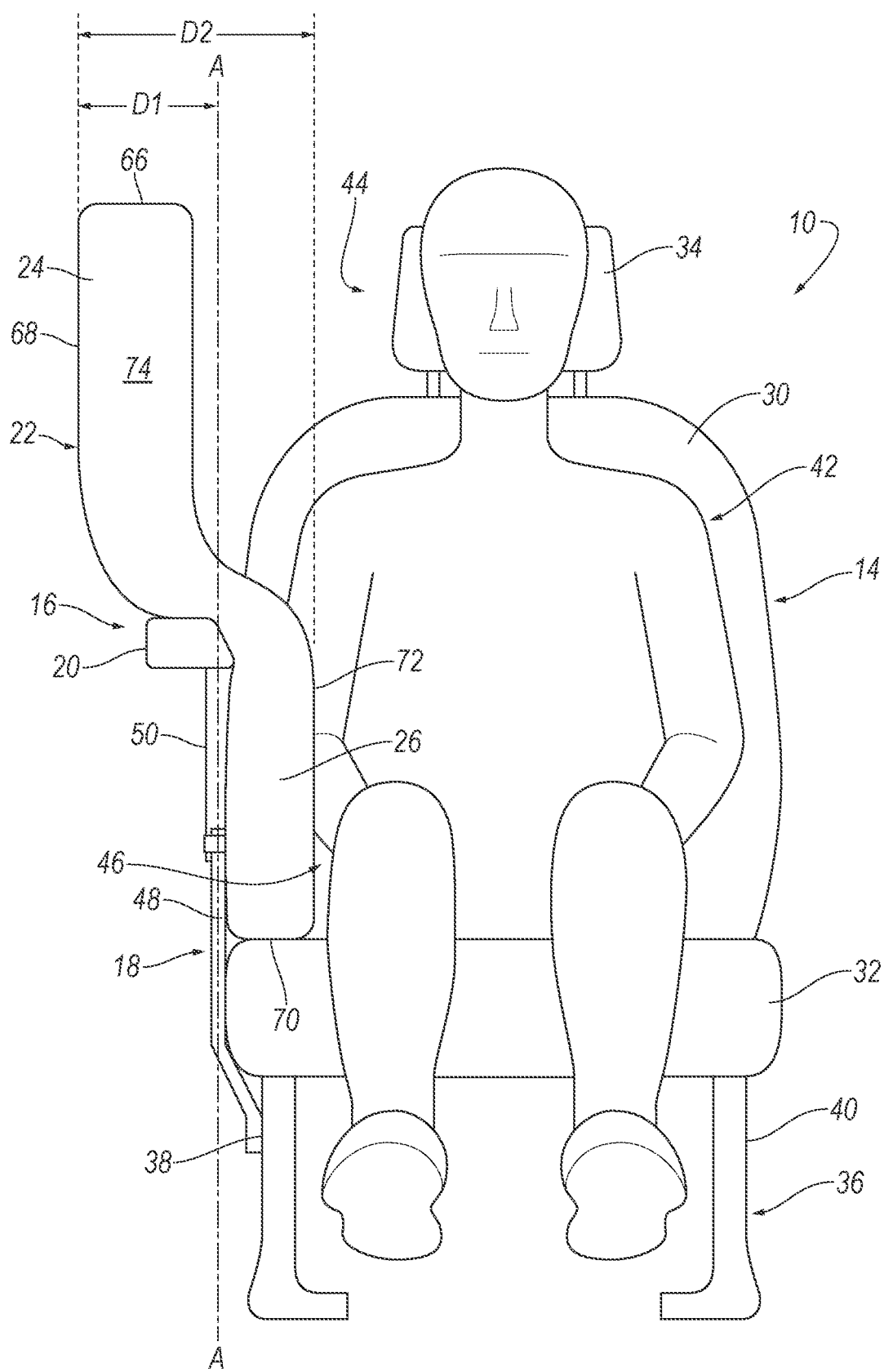
FIG. 5 is a frontal view of the seat with the armrest in the lowered position and the airbag in the inflated position.

With reference to FIGS. 4 and 5, the upright portion 18 is elongated along the axis A. The upright portion 18 is elongated from the seat frame 36, e.g., the seat bottom 32 frame, along the axis A. The upright portion 18 is elongated upwardly from the seat frame 36 from the seat frame 36 to the arm support portion 20.

The arm support portion 20 may be elongated in a generally seat-fore-and-aft direction. Specifically, the arm support portion 20 may be elongated in the seat-fore-and-aft direction and may deviate from the seat-fore-and-aft direction at a suitable angle to support an arm of an occupant. The arm support portion 20 may be covered, e.g., with an upholstery, padding, etc.

In the event of an impact to the vehicle 12, the armrest 16 is extendable upwardly along the axis A from a lowered position to a raised position. Specifically, the upright portion 18 of the armrest 16 may be extendable along the axis A. In response to the impact to the vehicle 12, the armrest 16 may move from the lowered position to the raised position. The armrest 16 is extendable from the lowered position to the raised position adjacent the occupant in the event of an impact to the vehicle 12. The upright portion 18 of the armrest 16 may extend in height from the lowered position to the upward position. In other words, the upright portion 18 is longer in the raised position than in the lowered position. The arm support portion 20 is movable upwardly along the axis A as the armrest 16 extends from the lowered position to the raised position. In the event of an impact to the vehicle 12, the arm support portion 20 is movable upwardly as the armrest 16 extends from the lowered position to the raised position. The armrest 16 may extend upwardly adjacent the occupant seating area 42 of the seat 14, i.e., adjacent an occupant properly seated in the seat 14.

Figure 6:
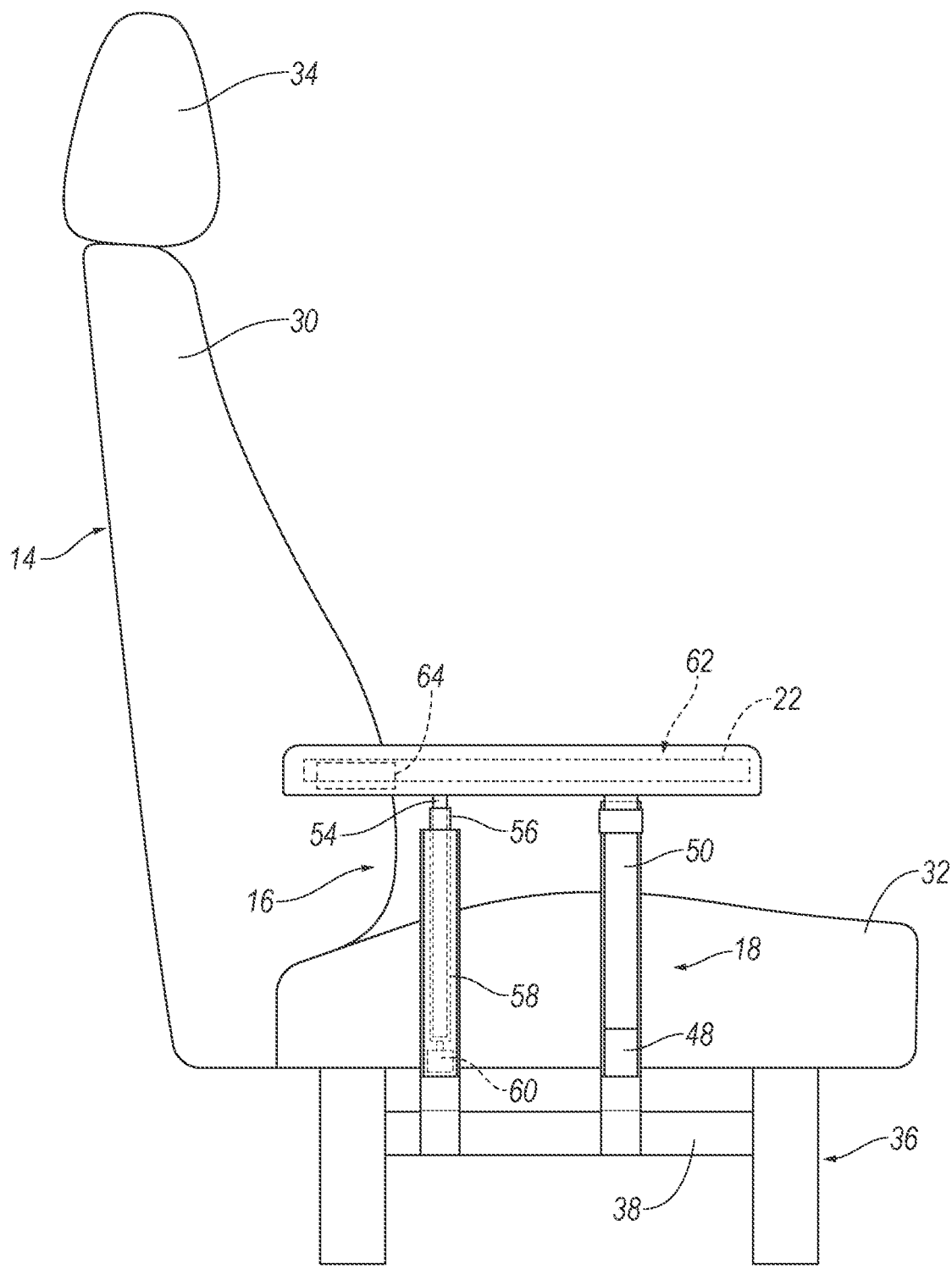
FIG. 6 is a side view of the seat with the armrest in the lowered position.
Figure 7:
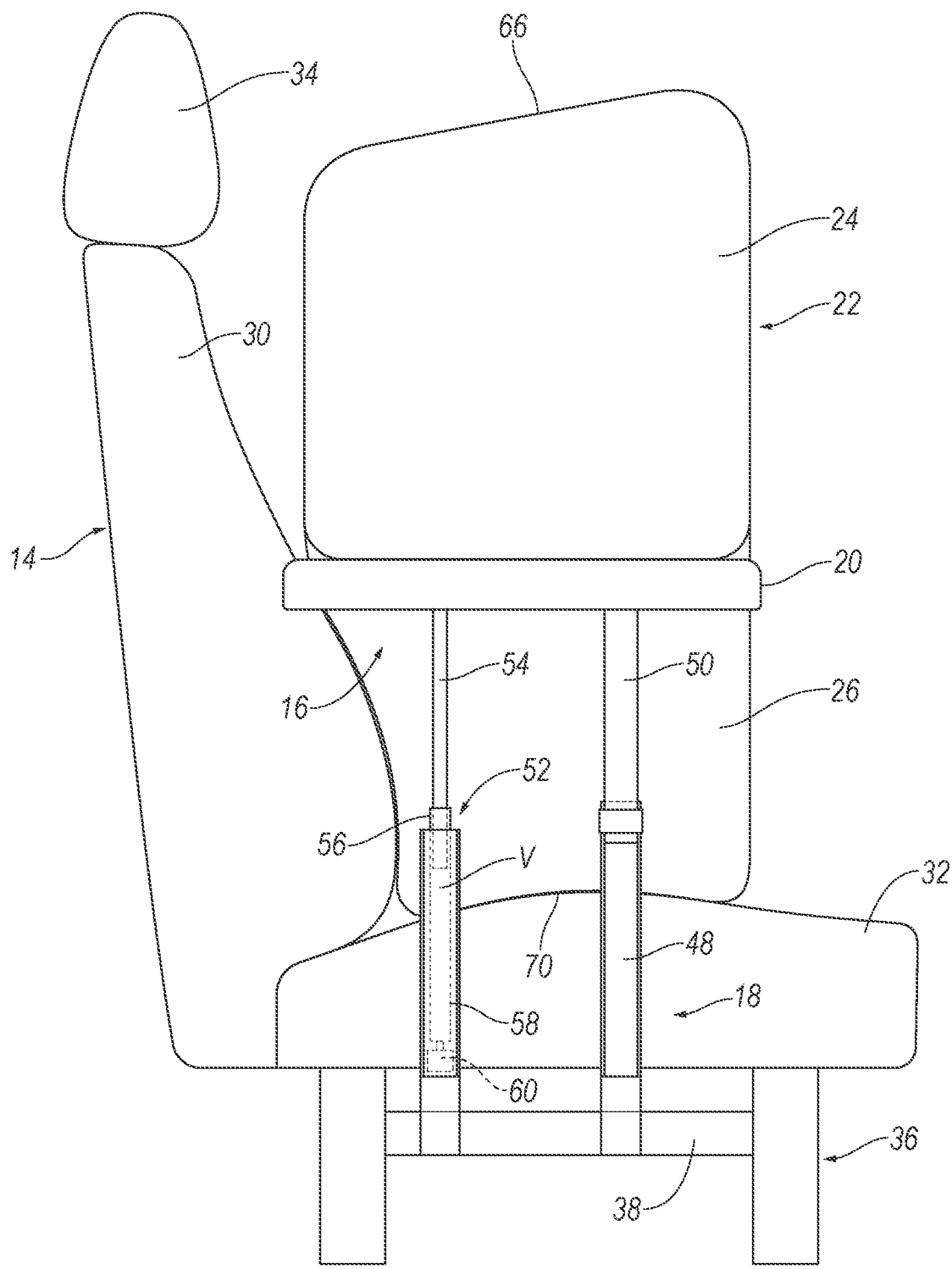
FIG. 7 is a side view of the seat with the armrest in the raised position and the airbag in the inflated position.

With reference to FIGS. 6 and 7, the upright portion 18 may include a track 48 and a carrier 50. The track 48 and the carrier 50 may each be elongated along the axis A. The arm support portion 20 may be supported by the carrier 50. In other words, the carrier 50 may extend downwardly from the arm support portion 20 and into the track 48. The track 48 may be supported by the seat frame 36, e.g., the seat bottom 32 frame. The track 48 may be elongated upwardly from the seat frame 36 to the carrier 50. The carrier 50 may overlap the track 48 and be movable along the track 48.

The carrier 50 may be movable along the track 48 as the armrest 16 extends from the lowered position to the raised position. The carrier 50 may be movable upwardly along the track 48 from the lowered position to the raised position. As discussed above, the arm support portion 20 is movable upwardly as the armrest 16 extends from the lowered position to the raised position. Specifically, the arm support portion 20 is movable upwardly along the track 48 as the carrier 50 moves along the track 48 from the lowered position to the raised position.

With continued reference to FIGS. 6 and 7, the upright portion 18 may include a piston 52 elongated along the axis A. The piston 52 may include a piston rod 54 connected to the arm support portion 20 and a piston cylinder 56 supported by the seat frame 36, e.g., the seat bottom 32 frame. The piston rod 54 and the piston cylinder 56 may each be elongated along the axis A. The piston cylinder 56 may be elongated from a top to a bottom and define a bore 58 elongated from the top to the bottom. The bore 58 may have a constant cross-section along the axis A.

The piston rod 54 is insertable into the piston cylinder 56 through the bore 58 to define a volume V. The volume V may have a constant cross-section along the axis A. The piston rod 54 may have a circular cross-section slightly smaller than a diameter of the bore 58 such that the piston rod 54 may be insertable into the piston cylinder 56. The piston rod 54 may be positioned in the bore 58 such that the piston rod 54 encloses the volume V. The piston 52 may include an O-ring (not shown) extending around the piston rod 54 to form a seal between the piston rod 54 and the bore 58 of the piston cylinder 56.

The piston rod 54 may be linearly movable in the bore 58. Specifically, the piston rod 54 may be movable along the axis A to move the arm support portion 20 upwardly along the axis A. In other words, the piston rod 54 is movable axially relative to the piston cylinder 56 to move the arm support portion 20 upwardly along the axis A. The piston rod 54 moves between a raised position and a lowered position to move the upright portion 18 between the raised position and the lowered position. Specifically, the piston rod 54 is in the raised position when the armrest 16 is in the raised position and the piston rod 54 is in the lowered position when the armrest 16 is in the lowered position. The upright portion 18 extends along the axis A toward the raised position by the piston rod 54 moving along the axis A toward the raised position.

As the piston rod 54 moves toward the raised position, the volume V becomes larger. In other words, the volume V is smaller when the piston rod 54 and armrest 16 are in the lowered positions than in the raised positions. A pyrotechnic device 60 is operatively coupled to the piston 52. Specifically, when the pyrotechnic device 60 is activated, the piston rod 54 may move upwardly within the bore 58 to move the arm support portion 20 toward the raised position. The pyrotechnic device 60 may ignite a chemical reaction to generate a gas medium that fills the volume V to move piston rod 54 upwardly in the piston cylinder 56. In other word, the gas medium moves the piston rod 54 upwardly as the volume V increases from the pyrotechnic device 60 being activated.

The assembly 10 may include one or more airbag assemblies 62. The airbag assembly 62 may be supported by the armrest 16. In the example shown in FIGS. 2-7, the airbag assembly 62 is supported by the arm support portion 20 of the armrest 16. The airbag assembly 62 may be supported by the arm support portion 20 in any suitable way, e.g., the arm support portion 20 may be mounted to the arm support portion 20 by fasteners, adhesive, etc.

The airbag assembly 62 may include the airbag 22 supported by the arm support portion 20, a housing (not shown), and an inflator 64. The airbag 22 is inflatable from an uninflated position and the inflated position. Specifically, the inflator 64 inflates the airbag 22 from the uninflated position to the inflated position, as described further below.

The inflator 64 is in fluid communication with the airbag 22. The inflator 64 expands the airbag 22 with inflation medium, such as a gas, to move the airbag 22 from the uninflated position to the inflated position. The inflator 64 may be supported by any suitable component. For example, the inflator 64 may be supported by the housing. The inflator 64 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 64 may be, for example, at least partially in the inflation chamber 74 to deliver inflation medium directly to the inflation chamber 74 or may be connected to the inflation chamber 74 through fill tubes, diffusers, etc.

In the event of an impact to the vehicle 12, the armrest 16 may move to the raised position while the airbag 22 is in the uninflated position. After the armrest 16 moves to the inflated position, the airbag 22 may inflate to the inflated position. In other words, the airbag 22 is in the inflated position when the armrest 16 is in the raised position and the airbag 22 is in the uninflated position when the armrest 16 is in the lowered position. Specifically, the inflation of the airbag 22 from the uninflated position to the inflated position is delayed until after the armrest 16 is in the raised position. The airbag 22 may be supported by and inflatable from a seat-inboard side of the arm support portion 20. Specifically, the airbag 22 is supported on a side of the arm support portion 20 that is adjacent the occupant seating area 42 of the seat 14, i.e. the seat-inboard side of the arm support portion 20.

Figure 3:
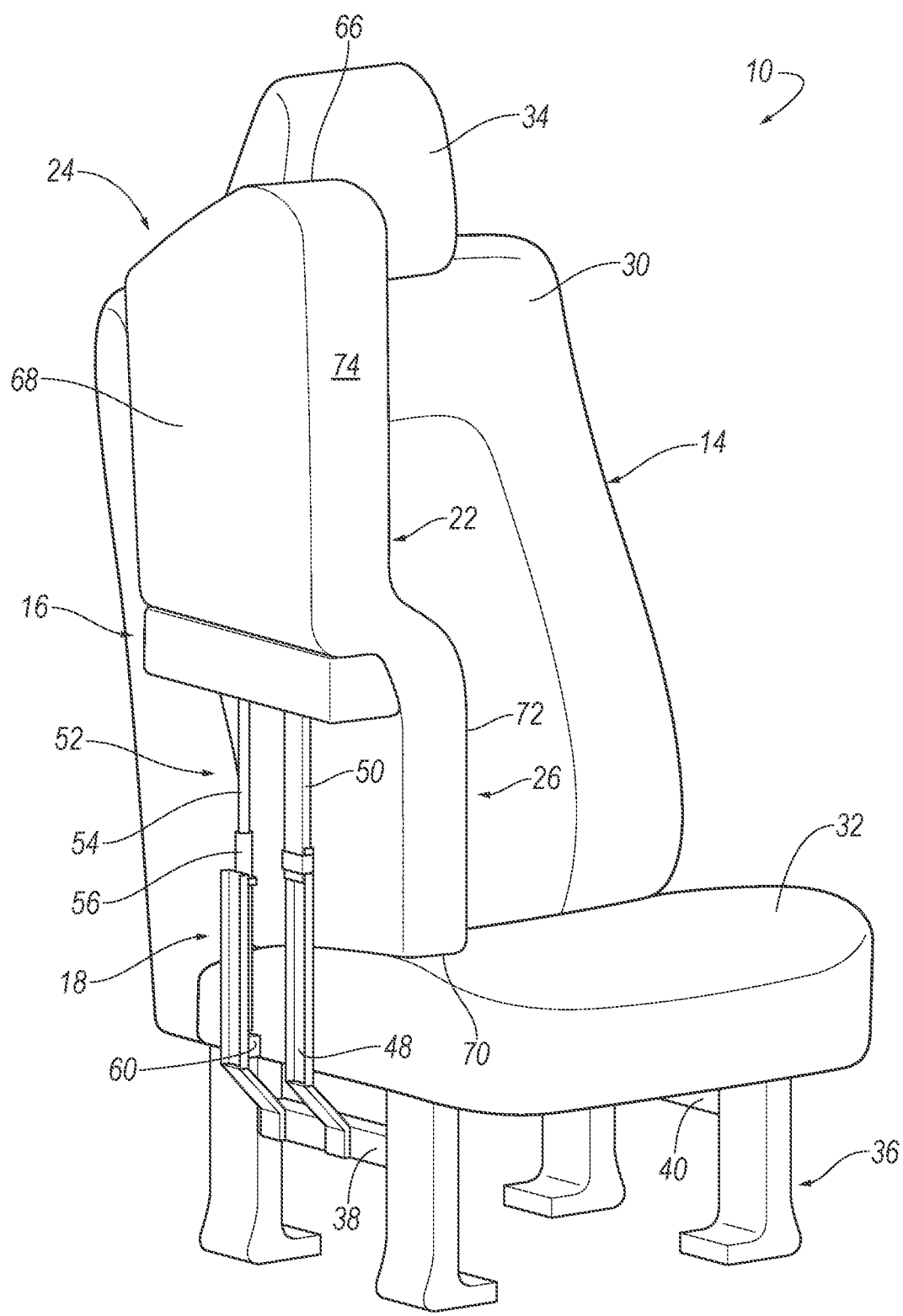
FIG. 3 is a perspective view of the seat with the armrest in a raised position and an airbag supported by the armrest in an inflated position.

With reference to FIGS. 3, 5, and 7, the airbag 22 includes the upper portion 24 and the lower portion 26. When the airbag 22 is in the inflated position, the upper portion 24 extends upwardly from the arm support portion 20 when the airbag 22 is in the inflated position. Specifically, the upper portion 24 is elongated upwardly along the axis A from the arm support portion 20 when the airbag 22 is in the inflated position. The upper portion 24 may be elongated from the arm support portion 20 to an upper distal end 66. The upper distal end 66 may be spaced upwardly from the arm support portion 20. The upper distal end 66 may be adjacent the head restraint 34 when the airbag 22 is in the inflated position.

The upper portion 24 includes an inboard panel 68 elongated along the axis A when the airbag 22 is in the inflated position. The inboard panel 68 of the upper portion 24 is spaced from the axis A in a cross-vehicle direction. The inboard panel 68 is spaced vehicle-inboard from the axis A. In other words, the inboard panel 68 is offset vehicle-inboard from the axis A. The inboard panel 68 may be offset from the axis A by a first distance D1.

In the inflated position, the upper portion 24 is vehicle-inboard of the seat 14. The upper portion 24 is vehicle-inboard of the upright portion 18 of the armrest 16. Specifically, the upper portion 24 is vehicle-inboard of the axis A of the armrest 16. In the example shown in the Figures, the upper portion 24 may be between the two seats 14 at the front of the vehicle 12 in the inflated position.

With reference to FIG. 5, the upper portion 24 of the airbag 22 may be adjacent the occupant head area 44 defined by the seat 14 when the airbag 22 is in the inflated position. Specifically, the upper portion 24 is sized and shaped to extend adjacent the occupant head area 44, i.e., the area occupied by the head of the occupant in the seat 14. The upper portion 24 may control the kinematics of an occupant seated in the seat 14 of the vehicle 12, i.e., an occupant occupying the occupant head area 44 defined by the seat 14. The upper portion 24 may limit interaction between the head of the occupant with other occupants of the vehicle 12, such as, an occupant of the seat 14 adjacent the occupant.

In the inflated position, the lower portion 26 extends downwardly from the arm support portion 20 when the airbag 22 is in the inflated position. Specifically, the lower portion 26 is elongated downwardly along the axis A from the arm support portion 20 when the airbag 22 is in the inflated position. The lower portion 26 is elongated from the arm support portion 20 to a lower distal end 70. The lower distal end 70 is spaced downwardly from the arm support portion 20 and the upper distal end 66 of the upper portion 24.

The lower portion 26 includes an outboard panel 72 elongated along the axis A when the airbag 22 is in the inflated position. The outboard panel 72 of the lower portion 26 is spaced from the axis A in the cross-vehicle direction. The outboard panel 72 is spaced vehicle-outboard from the axis A. In other words, the outboard panel 72 is offset vehicle-outboard from the axis A. The outboard panel 72 may be spaced from the inboard panel 68 by a second distance D2.

With reference continued reference to FIG. 5, in the inflated position, the lower portion 26 is vehicle-outboard of the upright portion 18 of the armrest 16. Specifically, the lower portion 26 is vehicle-outboard of the axis A. In other words, the lower portion 26 of the airbag 22 is on an opposite side of the axis A from the upper portion 24. The lower portion 26 of the airbag 22 is between the occupant seating area 42 and the upright portion 18 of the armrest 16. Specifically, the lower portion 26 of the airbag 22 abuts the upright portion 18 of the armrest 16 when the airbag 22 is in the inflated position and when the armrest 16 is in the raised position. The lower portion 26 uses the upright portion 18 of the armrest 16 as a reaction surface in the event of an impact to the vehicle 12.

The occupant hip area 46 may be adjacent the armrest 16, e.g., the upright portion 18 of the armrest 16. The lower portion 26 may be adjacent the occupant hip area 46 defined by the seat 14. Specifically, the lower portion 26 is sized and shaped to extend adjacent the occupant hip area 46, i.e., the area occupied by the hip of the occupant in the seat 14. The lower distal end 70 may be adjacent the occupant hip area 46 of the seat 14. The lower portion 26 may be between the occupant hip area 46 and the upright portion 18 of the armrest 16. The lower portion 26 may control the kinematics of an occupant seated in the seat 14 of the vehicle 12, i.e., an occupant occupying the occupant hip area 46 defined by the seat 14.

The outboard panel 72 of the lower portion 26 is spaced from the inboard panel 68 of the upper portion 24 in the cross-vehicle direction when the airbag 22 is in the inflated position. The outboard panel 72 is on an opposite side of the axis A from the inboard panel 68. In other words, the each of the outboard panel 72 and the inboard panel 68 are offset from the axis A on opposite sides of the axis A. Specifically, the second distance D2 between the inboard panel 68 and the outboard panel 72 is larger than the first distance D1 between the inboard panel 68 and the axis A, i.e., the inboard panel 68 of the upper portion 24 is spaced farther from the outboard panel 72 than from the axis A.

The airbag 22 defines an inflation chamber 74 that extends from the upper portion 24 to the lower portion 26 of the airbag 22. In other words, the upper portion 24 of the airbag 22 and the lower portion 26 of the airbag 22 are in fluid communication with each other. In the event of an impact and after the armrest 16 moves to the raised position, the airbag 22 inflates by the inflation medium from the inflator 64 filling the inflation chamber 74. The inflation medium may freely move between the upper portion 24 and the lower portion 26.

The airbag 22 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The vehicle 12 includes a computer 76 including a processor and a memory. The computer 76 may be a restraints control module. The memory includes one or more forms of computer 76 readable media, and stores instructions executable by the computer 76 for performing various operations, including as disclosed herein and including, for example, method 900 shown in FIG. 9 and described below. For example, the computer 76 may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, a computer 76 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 76. The memory may be of any type, e.g., hard disk drives, solid state drives, servers, or any volatile or non-volatile media. The memory may store the collected data sent from the sensors. The memory may be a separate device from the computer 76, and the computer 76 may retrieve information stored by the memory via a network in the vehicle 12, e.g., over a CAN bus, a wireless network, etc. Alternatively or additionally, the memory may be part of the computer 76, e.g., as a memory of the computer 76. The computer 76 may include programming to operate one or more of vehicle 12 brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer 76, as opposed to a human operator, is to control such operations.

Additionally, the computer 76 may be programmed to determine whether and when a human operator is to control such operations. The computer 76 may include or be communicatively coupled to, e.g., via a vehicle 12 network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc.

Figure 8:
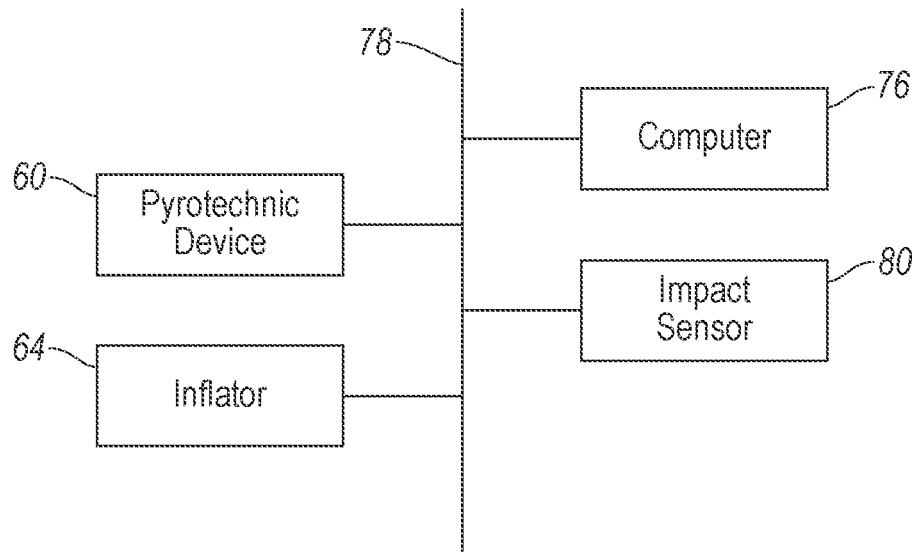
FIG. 8 is a block diagram of a vehicle communication network of a vehicle.

As shown in FIG. 8, the computer 76 is generally arranged for communications on a vehicle communication network 78 that may include a bus in the vehicle 12 such as a controller area network CAN or the like, and/or other wired and/or wireless mechanisms. Alternatively or additionally, in cases where the computer 76 includes a plurality of devices, the vehicle communication network 78 may be used for communications between devices represented as the computer 76 in this disclosure. Further, as mentioned below, various controllers and/or sensors may provide data to the computer 76 via the vehicle communication network 78.

The vehicle 12 may include at least one impact sensor 80 for sensing impact of the vehicle 12, and a computer 76 in communication with the impact sensor 80 and the inflators 64. The computer 76 may activate the inflators 64, e.g., provide an impulse to a pyrotechnic charge of the inflators 64 when the impact sensor 80 senses an impact of the vehicle 12. Alternatively or additionally to sensing impact, the impact sensor 80 may be configured to sense impact prior to impact, i.e., pre-impact sensing. The impact sensor 80 may be in communication with the computer 76. The impact sensor 80 is configured to detect an impact to the vehicle 12. The impact sensor 80 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 80 may be located at numerous points in or on the vehicle 12.

Figure 9:
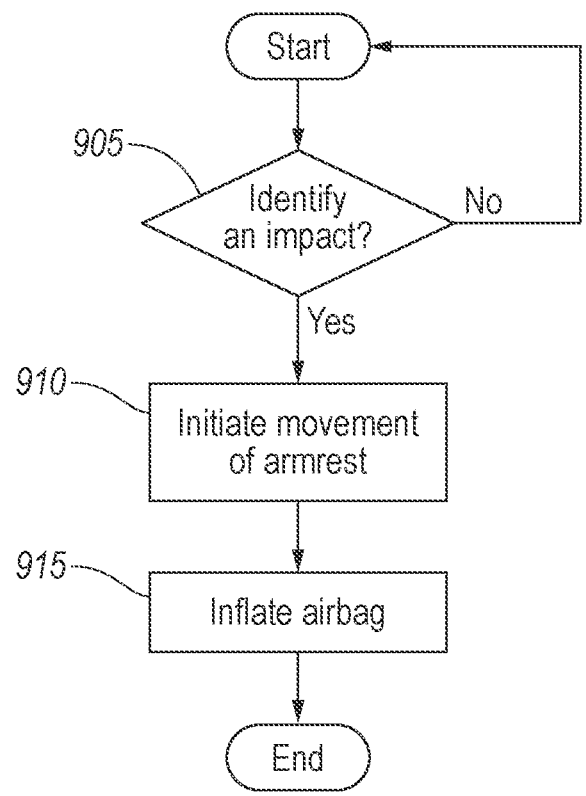
FIG. 9 is a flowchart of a method having instructions executable by a computer of the vehicle.

With reference to FIG. 9, the vehicle 12 computer 76 stores instructions to control components of the vehicle 12 according to the method 900 shown in FIG. 9. Specifically, the method 900 includes moving the armrest 16 to the raised position and the airbag 22 to the inflated position. Use of "in response to," "based on," and "upon determining" herein, including with reference to method 900, indicates a causal relationship, not merely a temporal relationship.

With reference to decision block 905, the method 900 includes identifying an impact to the vehicle 12. The impact sensors 80 of the vehicle 12 may identify the impact. If an impact is identified, the method 900 moves to block 910. If no impact is identified, the method 900 returns to its start.

With reference to block 910, in response to identification of the impact, the method 900 includes initiating movement of the armrest 16 along the axis A from the lowered position to the raised position. Block 910 includes activating the pyrotechnic device 60 to move the armrest 16 along the axis A. The pyrotechnic device 60 moves the arm support portion 20 upwardly to the raised position. After the armrest 16 reaches the raised position, the method 900 moves to block 915.

With reference to block 915, after initiating movement of the armrest 16 and after the armrest 16 reached the raised position, the method 900 includes inflating the airbag 22 to the inflated position. The upper portion 24 of the airbag 22 inflates upwardly from the arm support portion 20 and the lower portion 26 of the airbag 22 inflates downwardly from the arm support portion 20. The upper portion 24 and the lower portion 26 control the kinematics of the occupant of the seat 14.

The adjectives "first" and "second" are used herein as identifiers and do not indicate order or importance. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a vehicle seat;
   an armrest supported by the vehicle seat, the armrest including an upright portion elongated along an axis and an arm support portion supported by the upright portion; and
   an airbag supported by the arm support portion of the armrest, the airbag inflatable to an inflated position;
   the airbag including an upper portion extending upwardly from the arm support portion when the airbag is in the inflated position and a lower portion extending downwardly from the arm support portion when the airbag is in the inflated position;
   the upper portion being vehicle-inboard of the axis and the lower portion being vehicle-outboard of the axis.

2. The assembly of claim 1, wherein the lower portion of the airbag abuts the upright portion of the armrest when the airbag is in the inflated position.

3. The assembly of claim 1, wherein the upper portion of the airbag includes an inboard panel and the lower portion of the airbag includes an outboard panel, the inboard panel being spaced cross-vehicle from the outboard panel.

4. The assembly of claim 3, wherein the inboard panel is offset vehicle-inboard from the axis when the airbag is in the inflated position and the outboard panel is offset vehicle-outboard from the axis when the airbag is in the inflated position.

5. The assembly of claim 3, wherein the vehicle seat defines an occupant seating area, the lower portion of the airbag being between the occupant seating area and the upright portion of the armrest.

6. The assembly of claim 3, wherein the outboard panel is spaced from the axis by a first distance and the outboard panel is spaced from the inboard panel by a second distance, the second distance being larger than the first distance.

7. The assembly of claim 1, wherein the upper portion is vehicle-inboard of the vehicle seat.

8. The assembly of claim 1, wherein the vehicle seat defines an occupant head area and an occupant hip area below the occupant head area, the upper portion being adjacent the occupant head area and the lower portion being adjacent the occupant hip area.

9. The assembly of claim 1, wherein the airbag defines an inflation chamber that extends from the upper portion to the lower portion of the airbag.

10. The assembly of claim 1, wherein the upper portion is elongated upwardly along the axis and the lower portion is elongated downwardly along the axis.

11. The assembly of claim 1, wherein the airbag is supported by and inflatable from a seat-inboard side of the arm support portion.

12. The assembly of claim 1, wherein the armrest is extendable upwardly along the axis from a lowered position to a raised position.

13. The assembly of claim 12, wherein the airbag is inflatable from an uninflated position to the inflated position, the airbag being in the inflated position when the armrest is in the raised position and the airbag being in the uninflated position when the armrest is in the lowered position.

14. The assembly of claim 1, wherein the arm support portion is movable upwardly along the axis.

15. The assembly of claim 1, wherein the upright portion includes a track elongated along the axis, the arm support portion being movable along the track from a lowered position to a raised position.

16. The assembly of claim 1, wherein the upright portion includes a piston elongated along the axis, the arm support portion being movable along the axis by the piston.

17. The assembly of claim 16, further comprising a pyrotechnic device operatively coupled to the piston.

18. The assembly of claim 1, further comprising a computer including a processor and a memory storing instructions executable by the processor to:
   initiate movement of the armrest along the axis from a lowered position to a raised position; and
   inflate the airbag to the inflated position after initiation of movement of the armrest.

19. The assembly of claim 18, wherein the instructions to move the armrest along the axis from the lowered position to the raised position includes instructions to activate a pyrotechnic device to move the armrest along the axis.

* * * * *